United States Patent [19]
Fujita et al.

[11] Patent Number: 5,595,693
[45] Date of Patent: Jan. 21, 1997

[54] METHOD FOR AUTOMATICALLY SETTING INJECTION MOLDING SPEED CONDITION IN INJECTION MOLDING MACHINE

[75] Inventors: Shigeru Fujita; Hiroshi Okuyama; Kazuhiro Tashiro; Shogo Ishibashi, all of Numazu; Atsuhiro Suzuki, Fukushima; Motoyuki Hirata, Kawasaki, all of Japan

[73] Assignees: Toshiba machine Co., Ltd., Tokyo; Tohoku Munekata Co., Ltd., Fukushima; Showa Denko K.K., Tokyo, all of Japan

[21] Appl. No.: 363,907

[22] Filed: Dec. 27, 1994

[30] Foreign Application Priority Data

Dec. 27, 1993 [JP] Japan .................................. 5-332995

[51] Int. Cl.$^6$ ................................................. B29C 45/77
[52] U.S. Cl. .................... 264/40.1; 264/40.5; 264/328.1; 425/145
[58] Field of Search ................... 264/40.1, 40.5, 264/328.1; 425/135, 145, 149; 364/476

[56] References Cited

U.S. PATENT DOCUMENTS

| | | | |
|---|---|---|---|
| 5,296,179 | 3/1994 | Kamiguchi et al. | 425/145 |
| 5,316,707 | 5/1994 | Stanciu et al. | 425/145 |
| 5,340,297 | 8/1994 | Takizawa et al. | 425/145 |
| 5,425,906 | 6/1995 | Hashimoto | 264/40.1 |

FOREIGN PATENT DOCUMENTS

| | | |
|---|---|---|
| 58-86327 | 6/1983 | Japan . |
| 61-69423 | 4/1986 | Japan . |
| 2063516 | 6/1981 | United Kingdom . |

*Primary Examiner*—Jill L. Heitbrink
*Attorney, Agent, or Firm*—Cushman Darby & Cushman, L.L.P.

[57] ABSTRACT

A reference pressure of melted material injected to a mold cavity of a mold is set as a function of injection passing time from a start of an injecting process or a function of a distance of movement of an injection plunger, and the movement of the plunger is started at a temporarily constant injection speed. A correction value of the injection speed is obtained to eliminate a difference between a sensed pressure of the melted material injected to the mold cavity of the mold and the reference pressure in a range that the sensed pressure of the melted material exceeds the reference pressure during the injection passing time from the start of the injection process wherein the plunger is started to move or during the movement of the plunger, and the injection speed is corrected in accordance with the corrected value. The corrected value of the injection speed, and the injection passing time from the start of the injection process or the distance of the movement of the plunger, those of which corresponding to the range, are memorized in a memory unit, and are characterized to a desired injection speed pattern, and the pattern is read out from the memory unit as an injection molding speed condition.

6 Claims, 8 Drawing Sheets

METHOD FOR AUTOMATICALLY SETTING INJECTION MOLDING SPEED CONDITION IN INJECTION MOLDING MACHINE

BACKGROUND OF THE INVENTION

1. Field of the Invention

The present invention relates to a method for automatically setting an injection molding speed condition in an injection molding machine which moves an injection plunger thereby injecting melted material to a mold cavity of a mold.

2. Description of the Related Art

Conventionally, skilled workers set an injection molding speed condition by supposing a flow of melted material in a mold cavity of an injection mold on a basis of a shape of the mold cavity of the injection mold and the melted material, and by checking a finish of a trially-molded product.

Japanese Patent Application KOKAI Publication No. 61-69423 discloses that an amount of pressurized fluid, which is supplied to a hydraulic pressure cylinder of a hydraulic pressure unit for moving an injection plunger of an injection molding machine, is controlled on a basis of an injection material filling pressure sensed by a material pressure sensor provided in a mold cavity of the injection mold, so that injection material filling pressure (injection mold expanding force) is set to be a predetermined reference value. However, an object of such a conventional invention is that the injection mold is not be subjected to extra internal stress by extra injection material filling pressure. The above prior art does not specify how the injection speed (condition of the injection molding speed) of the melted material in an injection process, from a start of the injection process to an end of the injection process, is specifically set.

Moreover, Japanese Utility Model Application KOKAI Publication No. 58-86327 discloses that speed of melted material injected from an injection molding machine is controlled such that a plurality of resin pressure sensors provided in a mold cavity of an injection mold sense a predetermined pressure. However, in even this prior art, it is not specified how the injection speed (condition of an injection molding speed) of the melted material of an injection process, from a start of the injection process to an end of the injection process, is specifically set.

In setting the injection molding speed by the skilled workers, if a shape of a mold cavity of an injection mold is complicated, the number of trial-moldings is increased, so that it takes much time to set the injection molding speed.

The present invention has been derived from the above-mentioned circumstances. An object of the present invention is to provide a method for automatically setting an injection molding speed in an injection molding machine, which can easily set the injection molding speed with a small number of trial-moldings.

SUMMARY OF THE INVENTION

In order to achieve the above object, a method for automatically setting an injection molding speed condition in an injection molding machine which moves an injection plunger thereby injecting melted material to a mold cavity of a mold, comprises: a reference pressure setting step in which a reference pressure of melted material injected to the mold cavity of the mold is set as a function of injection passing time from a start of an injecting process or a function of a distance of movement of the plunger, and the movement of the plunger is started at a temporarily constant injection speed; an injection speed correcting step in which a correction value of the injection speed is obtained to eliminate a difference between a sensed pressure of the melted material injected to the mold cavity of the mold and the reference pressure in a range that the sensed pressure of the melted material exceeds the reference pressure during the injection passing time from the start of the injection process wherein the plunger is started to move or during the movement of the plunger, and the injection speed is corrected in accordance with the corrected value; and an injection molding speed condition setting step in which the corrected value of the injection speed, and the injection passing time from the start of the injection process or the distance of the movement of the plunger, those of which are corresponding to the range, are memorized in memorizing means, the corrected value and the injection passing time or the distance are characterized to a desired injection speed pattern, and the pattern is read out from the memorizing means as an injection molding speed condition.

Moreover, according to the present invention, a method for automatically setting an injection molding speed condition in an injection molding machine which moves an injection plunger thereby injecting melted material to a mold cavity of a mold, comprises: a reference pressure setting step in which a reference pressure of melted material injected to the mold cavity of the mold is set to be always constant in injection passing time from a start of an injecting process or in a distance of movement of the plunger, and the movement of the plunger is started at a temporarily constant injection speed; an injection speed correcting step in which a correction value of the injection speed is obtained to eliminate a difference between a sensed pressure of the melted material injected to the mold cavity of the mold and the reference pressure in a range that the sensed pressure of the melted material exceeds the reference pressure during the injection passing time from the start of the injection process wherein the plunger is started to move or during the movement of the plunger, and the injection speed is corrected in accordance with the corrected value; and an injection molding speed condition setting step in which the corrected value of the injection speed, and the injection passing time from the start of the injection process or the distance of the movement of the plunger, those of which are corresponding to the range, are memorized in memorizing means, and the corrected value and the injection passing time or the distance are characterized to a desired injection speed pattern, and the pattern is read out from the memorizing means as an injection molding speed condition.

The former method of this invention for automatically setting an injection molding speed condition in an injection molding machine is used in such injection molding machine that moves an injection plunger to inject melted material to a mold cavity of a mold, sets a reference pressure of melted material injected to the mold cavity of the mold as a function of injection passing time from a start of an injecting process or a function of a distance of movement of the plunger, and makes a movement of the plunger to start at a temporarily constant injection speed.

By this movement, a sensed pressure of the melted material injected to the mold cavity of the mold increases owing to a frictional force produced between an inner surface of the mold cavity and the melted material injected thereto, and becomes to exceed the reference value.

Therefore, a correction value of the injection speed is obtained to eliminate a difference between the sensed pressure and the reference pressure in a range that the sensed pressure of the melted material exceeds the reference pressure during the injection passing time from the start of the injection process or during the movement of the plunger, and the injection speed is corrected in accordance with the corrected value.

The corrected value of the injection speed, and the injection passing time from the start of the injection process or the distance of the movement of the plunger, those of which are corresponding to the range, are memorized in memorizing means, the corrected value and the injection passing time or the distance are characterized to a desired injection speed pattern, and the pattern is read out from the memorizing means as an injection molding speed condition.

The latter method of this invention for automatically setting an injection molding speed condition in an injection molding machine is also used in such injection molding machine that moves an injection plunger to inject melted material to a mold cavity of a mold, sets a reference pressure of melted material injected to the mold cavity of the mold to be always constant in injection passing time from a start of an injecting process or in a distance of movement of the plunger, and a movement of the plunger is started at a temporarily constant injection speed.

The operation of the latter method is the same as that of the former method.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An embodiment of the present invention will be explained with reference to the attached drawings.

Figure 1:
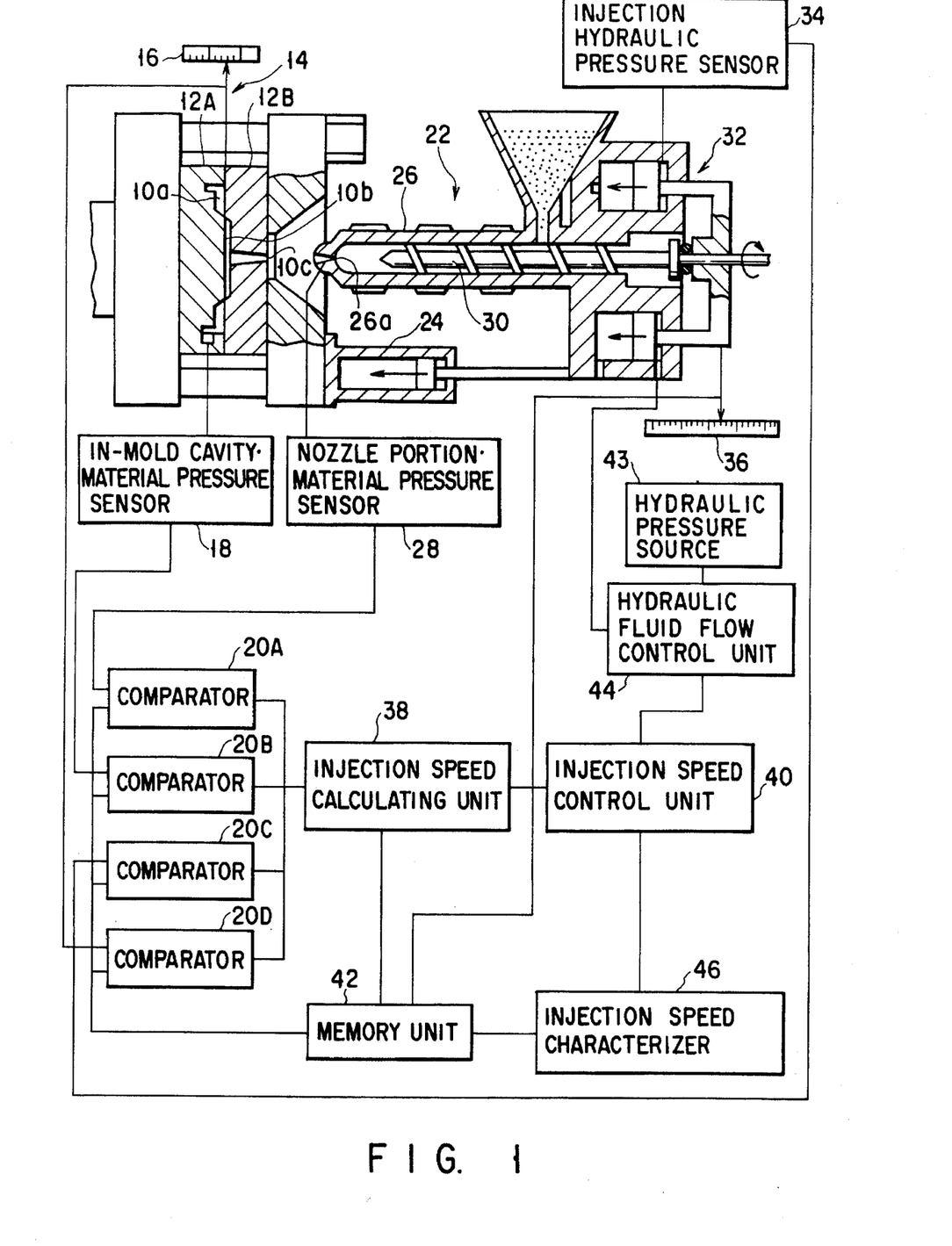
FIG. 1 is a schematic view showing a structure for executing a method of one embodiment of the present invention, to automatically set an injection molding speed condition of an injection molding machine.

FIG. 1 is a schematic view showing a structure for executing a method of one embodiment of the present invention for automatically setting an injection molding speed condition in an injection molding machine.

In an injection mold 14 in which two separable blocks 12A and 12B having mold cavities 10a and 10b are connected to each other with a predetermined pressure, a mold opening distance sensor 16 for detecting a separating distance between two blocks 12A and 12B is provided. An in-mold cavity material pressure sensor 18 for detecting a pressure of a melted material injected into the mold cavities 10a and 10b from an injection molding machine (to be described later) is also provided.

Each of the mold opening distance sensor 16 and the in-mold cavity material pressure sensor 18 is connected to each of comparators 20D and 20B, which are independent of each other.

An injection molding machine 22 is connected to the injection mold 14 through a hydraulic moving unit 24 by which the molding machine can be moved to connect to a material inlet of the mold cavities 10a and 10b and to separate therefrom.

A nozzle portion material pressure sensor 28 is provided in an injection nozzle 26a of a heating cylinder 26 of the injection molding machine 22, and an injection hydraulic pressure sensor 34 and an injection plunger moving distance sensor 36 are connected to a hydraulic moving unit 32 of an injection plunger 30, the plunger 30 serving as a melted material push member.

Each of the nozzle portion material pressure sensor 28 and the injection hydraulic pressure sensor 34 is connected to each of comparators 20A and 20C, which are independent of each other.

Each of four comparators 20A, 20B, 20C, and 20D is connected to an injection speed calculating unit 38. The injection speed calculating unit 38 is connected to an injection speed control unit 40, and a memory unit 42.

The injection speed control unit 40 is connected to a hydraulic fluid flow control unit 44, which is connected to a hydraulic pressure source 43 to move the hydraulic moving unit 32 of the injection plunger 30.

The injection plunger moving distance sensor 36 is connected to the memory unit 42, and the memory unit 42 is further connected to the injection speed control unit 40 through an injection speed characterizer 46.

Moreover, the memory unit 42 is connected to each of the comparators 20A, 20B, 20C, and 20D.

Figure 2:
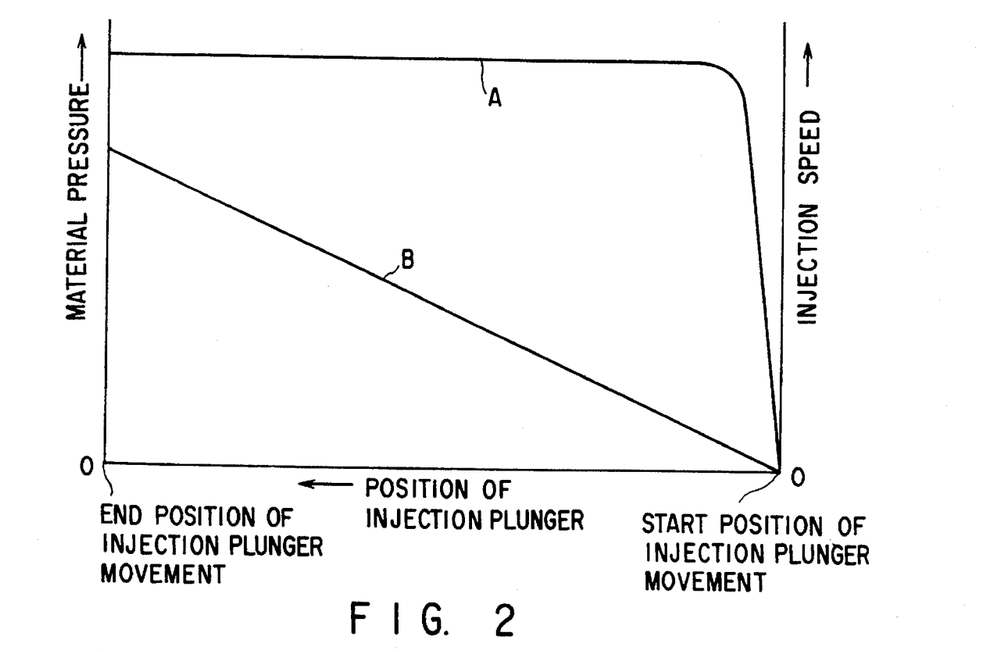
FIG. 2 is a graph showing a relationship between a position of an injection plunger and a material pressure in a mold cavity of a mold when an injection speed is constant.

FIG. 2 shows a relationship between a position (distance of movement) of an injection plunger and a material pressure B in the mold cavities 10a and 10b of the injection mold 14 when a material injection speed A from the injection nozzle 26a of the heating cylinder 26 of the injection molding machine 22 is constant.

As is apparent from FIG. 2, if the material injection speed A is constant, as the injection plunger 30 approaches the injection nozzle 26a, the material pressure B tends to increase in substantially proportionally to positive change in position of the plunger 30.

Figure 3:
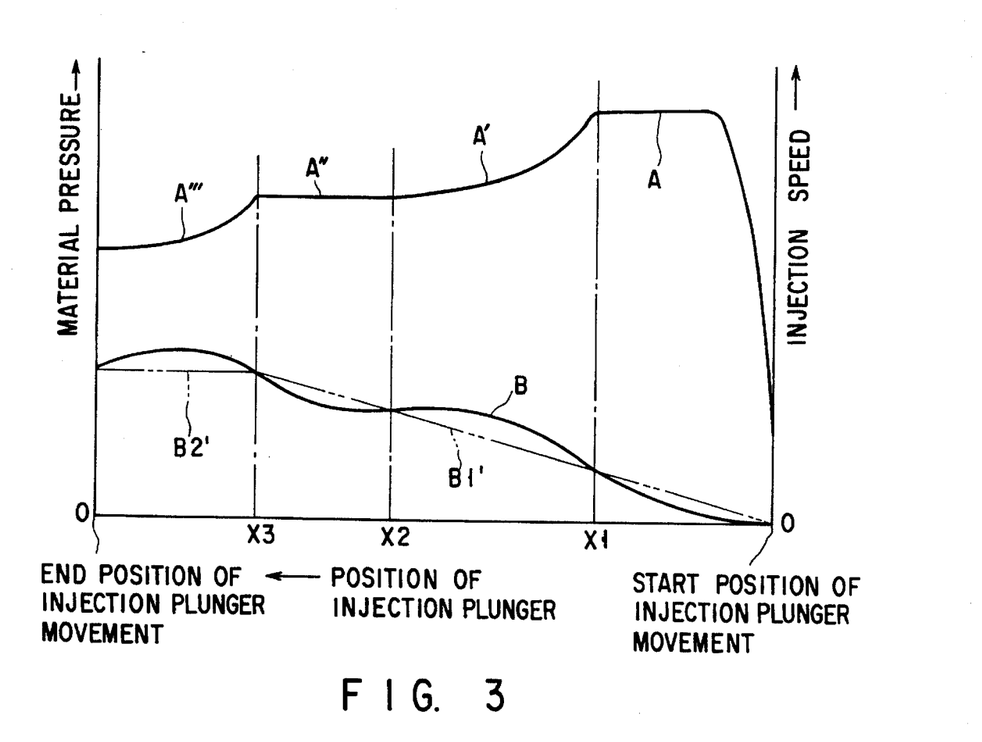
FIG. 3 is a graph showing a state in which the injection molding speed condition is automatically set by controlling the injection speed on a basis of the position of the injection plunger for obtaining a desired reference material pressure in the mold cavity of the mold.

FIG. 3 shows how injection molding speed of melted material is automatically set to obtain a desired material pressure.

In FIG. 3, a two-dot chine line, which is denoted by reference marks B1' and B2', shows a reference value of a desired material pressure, and a solid line, which is denoted by a reference mark B, shows an actual material pressure of the melted material, which is sensed by a pressure sensor to be described later while the melted material is being injected.

A stepwise solid line, which is denoted by reference marks A', A", and A'", shows a corrected state of the material injection speed (i.e., injection molding speed condition) in which the material injection speed is corrected to converge the sensed actual material pressure B to the reference values B1' and B2' of the above mentioned desired material pressure.

Figure 4:
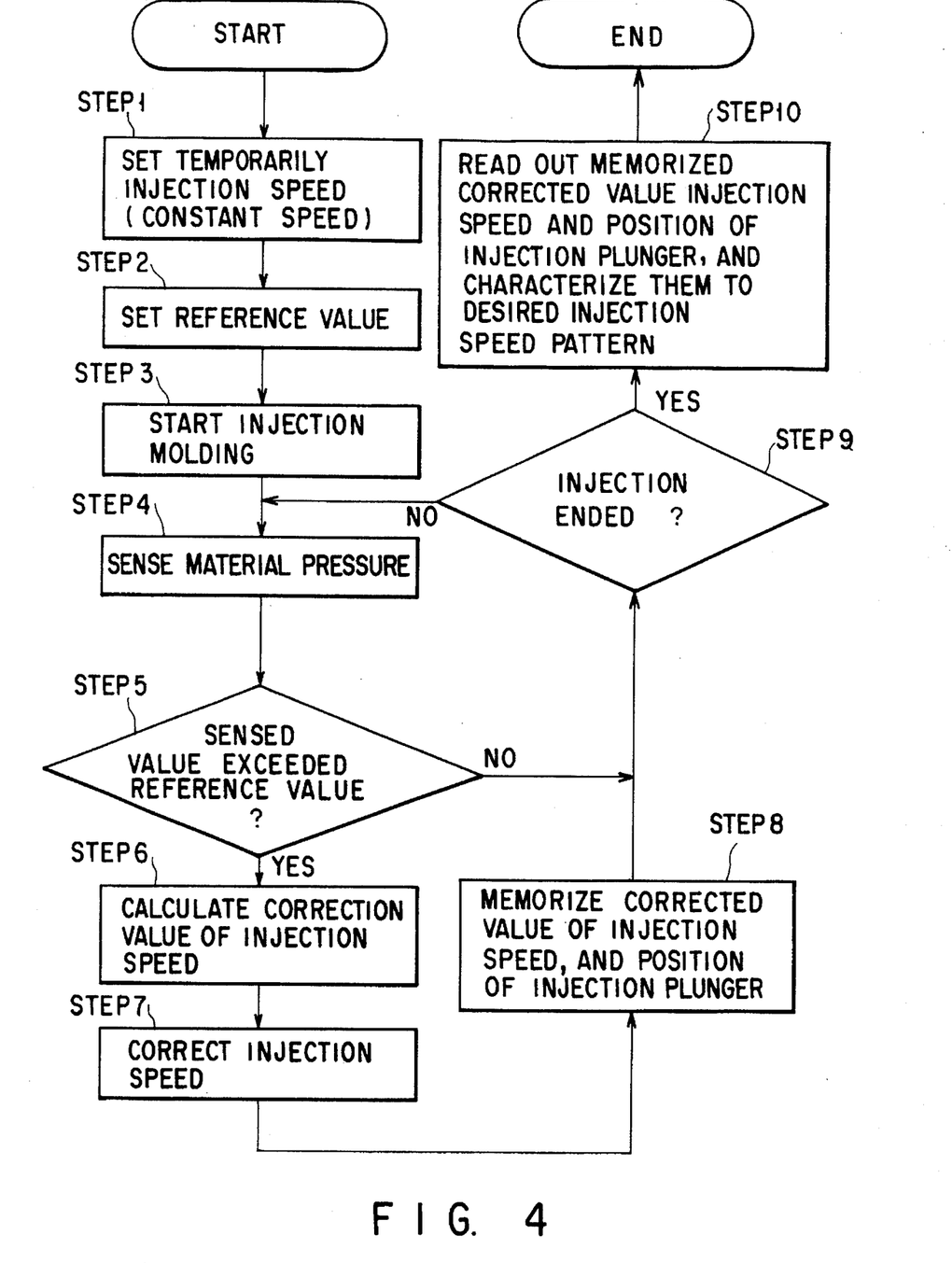
FIG. 4 is a flow chart schematically showing a process for automatically setting the injection molding speed condition.

FIG. 4 shows a flow chart of a process for automatically setting the injection molding speed condition, which is denoted by the reference marks A', A" and A'" in FIG. 3.

First of all, a speed (injection speed) of melted material, which is injected to the mold cavities 10a and 10b of the injection mold 14 from the injection molding machine 22 is temporarily and manually set in the memory unit 42 of FIG. 1 (STEP 1). For example, a desire constant speed, which is denoted by a solid line A of FIG. 2, is temporarily set as the injection speed.

Next, the in-mold material pressure or the nozzle portion material pressure each of which showing a pressure (material pressure) of the melted material being injected, the injection hydraulic pressure in the hydraulic moving unit 32 of the injection plunger 30, or the mold opening distance is set as a reference value of the material pressure in the memory unit 42 of FIG. 1 in the form of a function of a position of the injection plunger 30 or a function of injection passing time from a start of an injecting process (STEP 2).

A function of reference value B1' and that of reference value B2' of FIG. 3 may be separately set, or these functions may be set as one function, which spreads over both reference values.

Moreover, a plurality of reference values of resin pressure can be set so that they are parallel to a horizontal axis showing the position of the injection plunger, that is, each of these reference values, is always constant regardless of the position of the injection plunger.

Then, an injection process is started (STEP 3). At the same time, one or a plurality of detections of the mold opening distance, in-mold material pressure, nozzle portion material pressure, and injection hydraulic pressure is or are started by using the mold opening distance sensor 16, the in-mold cavity material pressure sensor 18, the nozzle portion material pressure sensor 28, and the injection hydraulic pressure sensor 34 (STEP 4). Then, the sensed value or values is or are compared with corresponding one of or the reference values memorized in the memory unit 42 by the comparators 20A, 20B, 20C, and 20D (STEP 5).

Moreover, from one or the plurality of comparing results in the comparators 20A, 20B, 20C, and 20D, if one or the plurality of the sensed values of the mold opening distance, in-mold material pressure, nozzle portion material pressure, and injection hydraulic pressure exceed the reference value $B_1'$ of FIG. 3 at an injection plunger position $X_1$ (STEP 5), a correction value of the injection speed is calculated by the injection speed calculating unit 38 in order to eliminate a difference between the sensed value or values and the reference value $B_1'$ (STEP 6). The injection speed control unit 40 controls the hydraulic fluid flow control unit 44 based on the calculated correction value of the injection speed (STEP 7). This is the state, which is denoted by A' of FIG. 3.

The corrected value of the injection speed, calculated as mentioned above, and the corrected position of the injection plunger are stored in the memory unit 42 of FIG. 1 (STEP 8).

Next, it is checked whether or not the injection plunger position reaches the end position thereof (i.e., the injection is ended) (STEP 9). If the injection plunger position has not reach the end position, the operation is returned to STEP 4.

As a result of the above-mentioned control, if the sensed value or values is or are lowered beyond the reference value $B_1'$ (STEP 5) at an injection plunger position $X_2$, the above-mentioned correction of the injection speed is not performed (the state which is denoted by A" of FIG. 3), and the operation is returned to STEP 4 through STEP 9.

Thereafter, if the above-sensed value or values exceed the reference value $B_2'$ at an injection plunger position $X_3$ (STEP 5), a correction value of the injection speed is calculated by the injection speed calculating unit 38 in order to eliminate a difference between the sensed value or values and the reference value $B_2'$ (STEP 6). The injection speed control unit 40 controls the hydraulic fluid flow control unit 44 based on the calculated correction value of the injection speed (STEP 7). This is the state, which is denoted by A''' of FIG. 3.

The corrected value of the injection speed, calculated as mentioned above, and the corrected position of the injection plunger are stored in the memory unit 42 of FIG. 1 (STEP 8).

Next, it is checked whether or not the injection plunger position reached the end position thereof (i.e., the injection is ended) (STEP 9). If the injection plunger position reaches the end position thereof, two corrected values A' and A''' of the injection speed and the injection plunger positions, at which the injection speed is corrected, in the range from the position $X_1$ to the position $X_2$ and from the position $X_3$ to the end position are read out from the memory unit 42. The corrected injection speed pattern, including the corrected values of the injection speed, are characterized, or converted to a desired injection speed pattern having a desired number of steps (3 to 10 steps) (the shape of each step is a rectangle, a polygonal line, or an inclined line) in consideration of the constant injection speed, which is temporarily set at first, the injection speed A'', which is not corrected, and the range of the injection plunger position from the position $X_2$ to the position $X_3$, in which the injection speed is not corrected (STEP 10). In this way, the process for automatically setting the injection molding speed condition is ended.

Next, STEP 10 is explained in more detail. Usually, the number of injection speed corrections in one injection molding operation (i.e., the number of injection speed correction steps obtained by calculation) is large. For instance, as demonstrated in FIG. 5, the number of injection speed correction steps calculated in that example is 20.

Typically, however, an injection molding machine can only accommodate 3–10 injection speed corrections in a single injection molding operation. Thus, the calculated injection speed correction steps must be converted, or characterized, to the number of steps which can actually be accommodated by the molding machine.

In step 10 if the number of injection speed steps set by the calculating result is unlimited, the actually sensed material pressure values from sensors 16, 18, 28, and 34 can be controlled to conform exactly with a target reference value. However, even if the number of injection speed steps set by the calculating result is characterized to the limited number of injection speed steps which a controller of the molding machine can accomadate, the actually sensed material pressure values from sensors 16, 18, 28, and 34 can be sufficiently controlled to conform with a target reference valve in practice. When molding is repeated, a firstly set injection speed pattern can be applied to all of the moldings.

The firstly temporarily set values of the injection speed, the starting position of the injection plunger movement and the end position of the injection plunger movement are used as the first valve at a first step of the injection molding (that is, in the predetermined set number of steps of the injection speed). The corrected values of the injection speed and the injection plunger position which are obtained firstly by the calculating result from the temporarily set values, are used as those of the injection speed and the injection plunger position at the second step in the predetermined set number of steps of the injection speed. Then, the calculating results of the second and the following steps (the number of the steps of the calculating result—1) are characterized within the range of the residual steps in the desired set number of steps (the desired set number of steps of the injection speed—2).

In the following, (the number of calculated corrections steps —1) is defined as X, (the maximum number of steps —2) is defined as Y, Z=X/Y (wherein figures below a decimal point are omitted, and an integer is used as Z), and X % Y is defined as a reminder obtained when X is divided by Y.

In the case of X>Y, the first set injection speed in the injection molding machine is equal to the first temporarily set calculated speed. The second injection speed set in the molding machine is set to the first calculated corrected value. Starting with the third injection speed set in the molding machine, the next Y–X % Y injection speeds set in the molding machine are set to every Z value of the calculated corrected value after the first calculated corrected value. Starting with the (3+(Y–X % Y)) injection speed set in the molding machine, the remaining injections speeds [i.e., (3+(Y–X % Y)) through (Y+2)] set in the molding machine will be set to every (Z+1) value of the calculated corrected value, from the [(1+Z (Y–X % Y))+(Z+1)] through the (X+1) calculated corrected value.

In the case of X=Y, the corrected values of the injection speeds and the injection plunger positions at the second and the following steps of the calculating result are directly characterized to the injection speeds and the injection screw positions at the third to the tenth steps of the predetermined set number of steps of the injection speed.

In the case of X<Y, the corrected values of the injection speeds and the injection plunger positions at the second and the following steps of the calculating result are directly characterized to the injection speeds and the injection plunger positions at the third and the following steps in the predetermined set number of steps of the injection speed, and the corrected values of the injection speed and the injection plunger position at the final step of the calculating result are used as each of the injection speeds and the injection plunger positions at the residual steps of the desired set number of the injection speed.

Figure 5:
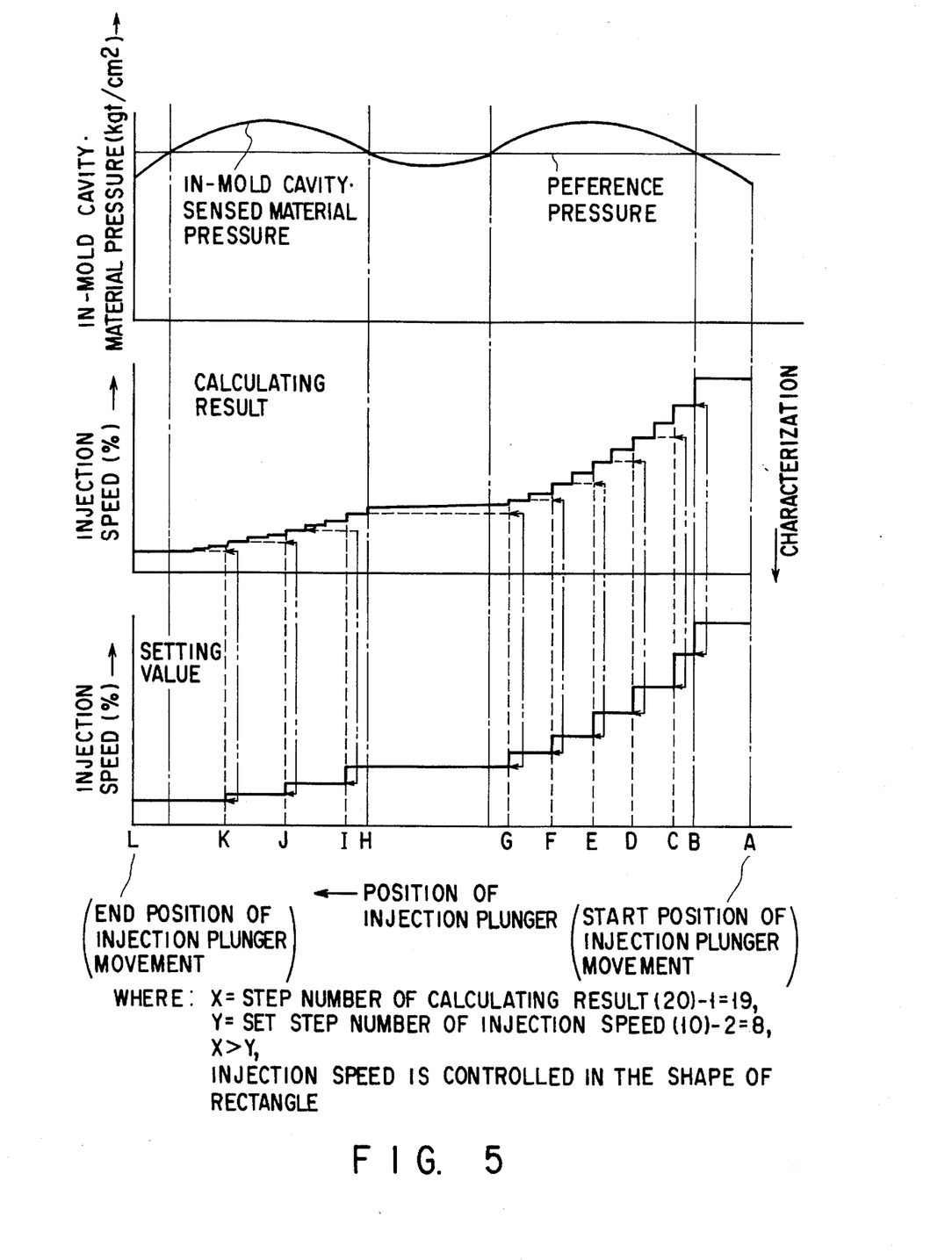
FIG. 5 is a view showing a characterizing example in which corrected values of injection speeds and those of injection plunger positions at a plurality of steps of a calculating result are characterized to values of injection speeds and injection plunger positions of the second and the following steps in a desired set number of steps, wherein the number of the steps of the calculating result is 20, a desired set number of the steps of the injection speed is 10, (that is, X=20−1=19, Y=10−2=8, X>Y), a reduction rate of the injection speed at a first step is 90.0%, and a pattern of each step of the injection speed is shaped in a rectangle.

FIG. 5 shows a characterizing example in which corrected values of injection speeds and those of injection plunger positions at a plurality of step of a calculating result are characterized to values of injection speeds and injection plunger positions of the second and the following steps in a desired set number of steps, wherein the number of steps of the calculating result is 20, a desired set number of steps of the injection speed is 10, (that is, X=20–1=19, Y=10–2=8, X>Y), a reduction rate of the injection speed at a first step is 90.0% in this example, and a pattern of each step of the injection speed is shaped in a rectangle.

The amount by which the speed is reduced may be determined on the basis of stored data (i.e., the amount of previous reductions) or the reduction may be determined by trial and error based on the type of resin material being used and the shape and size of the mold.

Illustrating the present method with FIG. 5, it can be seen that X=20–1=19; Y=10–2=8; Z=int(X/Y)=int(19/8)=2; and X % Y=remainder of X/Y=3. The first injection speed set in the molding machine, the segment extending from A to B in the lower graph, corresponds to the first temporarily set calculated speed in the middle graph. The second speed set in the molding machine, the segment from B to C in the lower graph, corresponds to the first calculated corrected value, i.e., the second horizontal portion from the right side of the middle graph. Starting with the third speed set in the molding machine, C to D in the lower graph, the next (Y−X % Y)=(8−3)=5 speeds set in the molding machine are set to every Z (2nd) value of the calculated corrected values. In other words, the 3rd, 4th (D to E), 5th (E to F), 6th (F to G), and 7th (G to I) speeds set in the molding machine correspond to the 3rd, 5th, 7th, 9th, and 11th calculated correction steps, respectively. Starting with the (3+(Y−X % Y))=(3+(8−3))=8th speed set in the molding machine, the remaining (3+(8−3)) through Y+2 or 8th through 10th speeds set in the molding machine correspond to every Z+1 calculated corrected value from the [(1+Z (Y−X % Y))+(Z+1)] through the X+1, [i.e., the [(1+2 (8−3))+(2+1)] through the 19+1 or the 14th through the 20th] corrected value. In other words, the 8th (I to J), 9th (J to K), and 10th (K to L) speeds set in the molding machine will correspond to the 14th, 17th, and 20th calculated corrected values, respectively.

Figure 6:
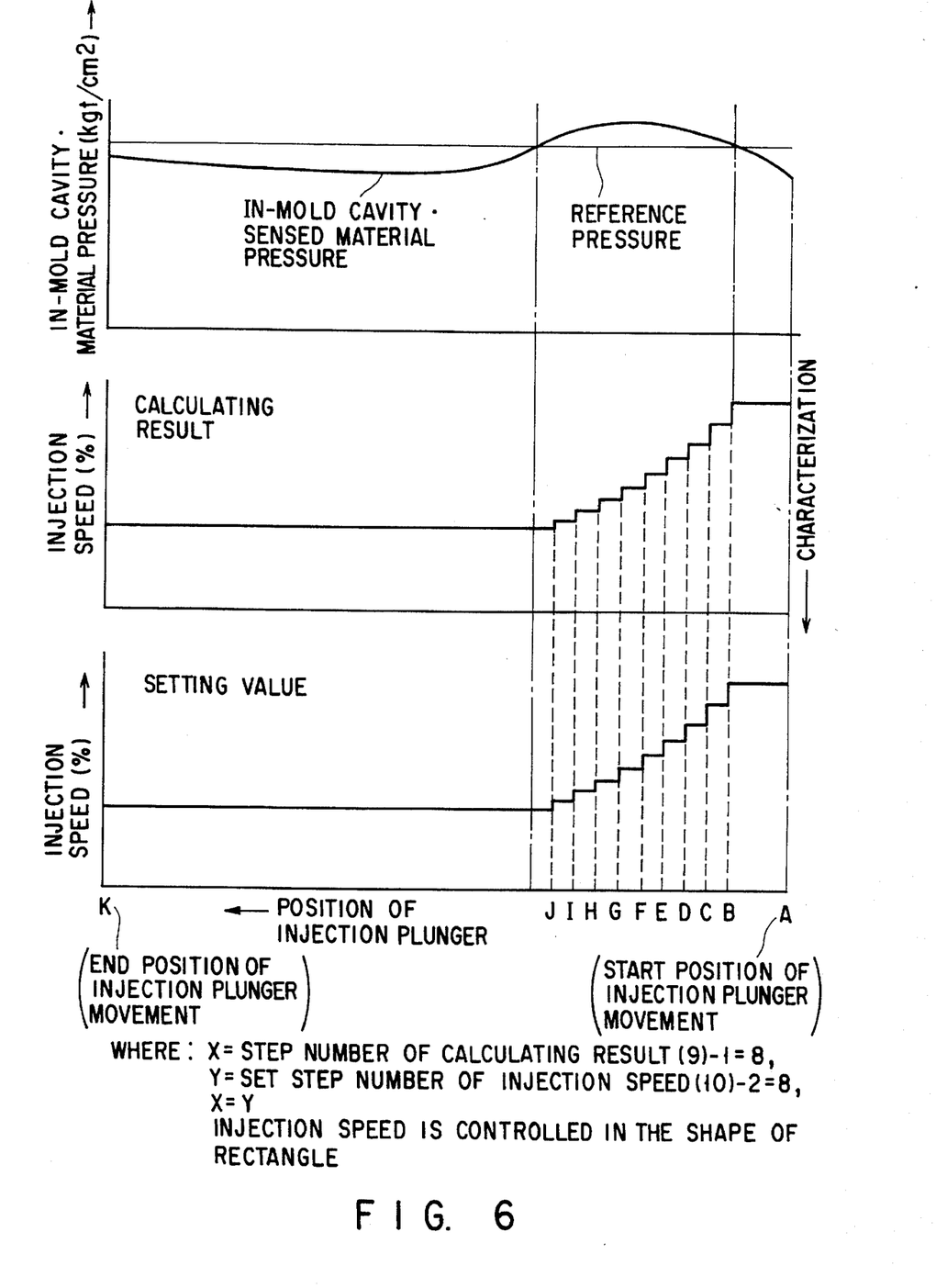
FIG. 6 is a view showing a characterizing example in which corrected values of injection speeds and those of injection plunger positions at a plurality of steps of a calculating result are characterized to values of injection speeds and injection plunger positions of the second and the following steps in a desired set number of steps, wherein the number of the steps of the calculating result is 9, a desired set number of the steps of the injection speed is 10, (that is, X=9−1=8, Y=10−2=8, X=Y), a reduction rate of the injection speed at a first step is 90.0%, and a pattern of each step of the injection speed is shaped in a rectangle.

FIG. 6 shows a characterizing example in which corrected values of injection speeds and those of injection plunger positions at a plurality of steps of a calculating result are characterized to values of injection speeds and injection plunger positions of the second and the following steps in a desired set number of steps, wherein the number of steps of the calculating result is 9, a desired set number of steps of the injection speed is 10, (that is, X=9−1=8, Y=10−2=8, X=Y), a reduction rate of the injection speed at a first step is 90.0% in this example, and a pattern of each step of the injection speed is shaped in a rectangle.

Figure 7:
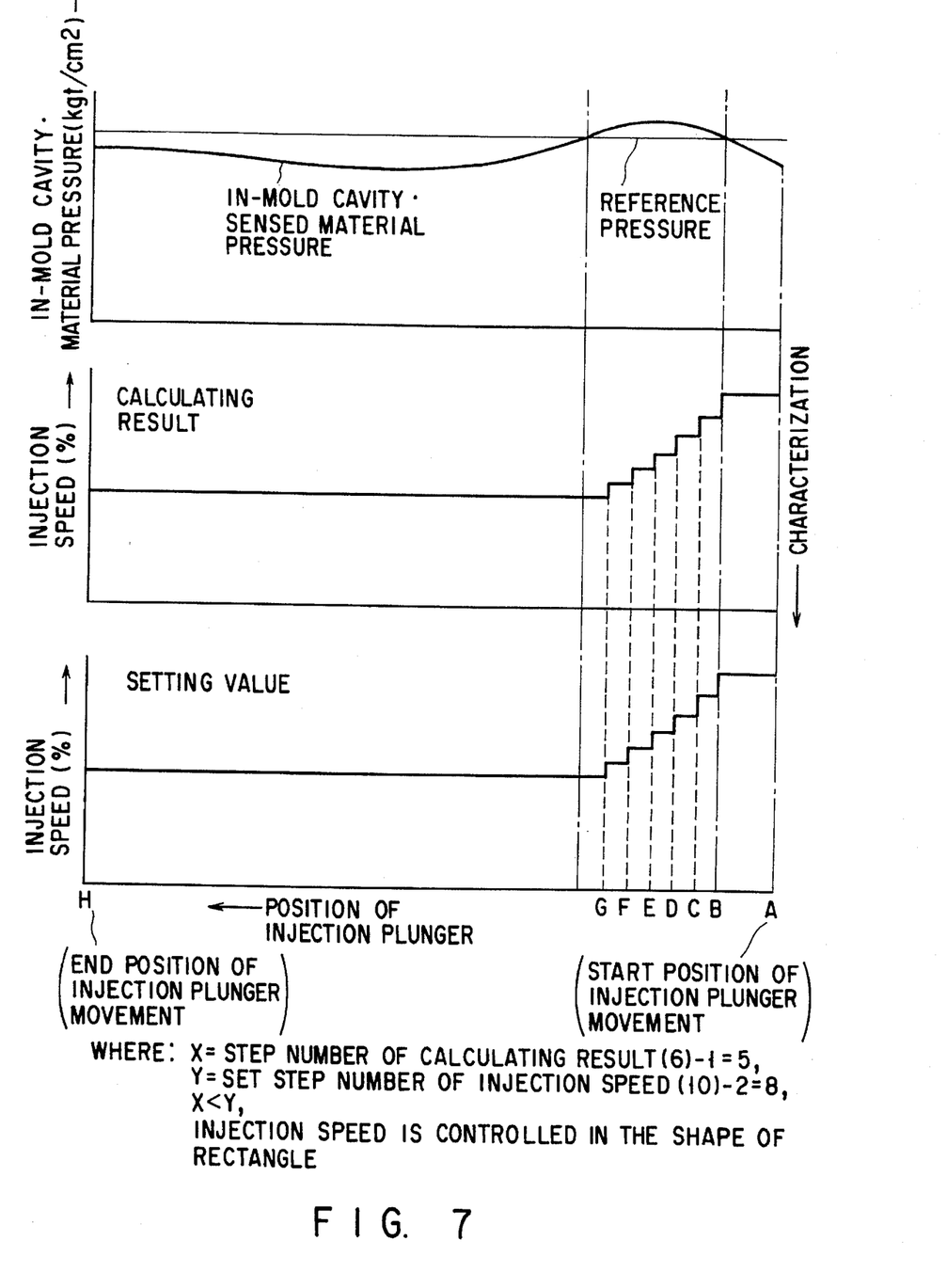
FIG. 7 is a view showing a characterizing example in which corrected values of injection speeds and those of injection plunger positions at a plurality of steps of a calculating result are characterized to values of injection speeds and injection plunger positions of the second and the following steps in a desired set number of steps, wherein the number of the steps of the calculating result is 6, a desired set number of the steps of the injection speed is 10, (that is, X=6−1=5, Y=10−2=8, X<Y), a reduction rate of the injection speed at a first step is 90.0%, and a pattern of each step of the injection speed is shaped in a rectangle.

FIG. 7 shows a characterizing example in which the number of steps of the calculating result is 6, a desired set number of the steps of the injection speed is 10, (that is, X=6−1=5, Y=10−2=8, X<Y), a reduction rate of the injection speed at a first step is 90.0% in this example, and a pattern of each step of the injection speed is shaped in a rectangle.

Figure 8:
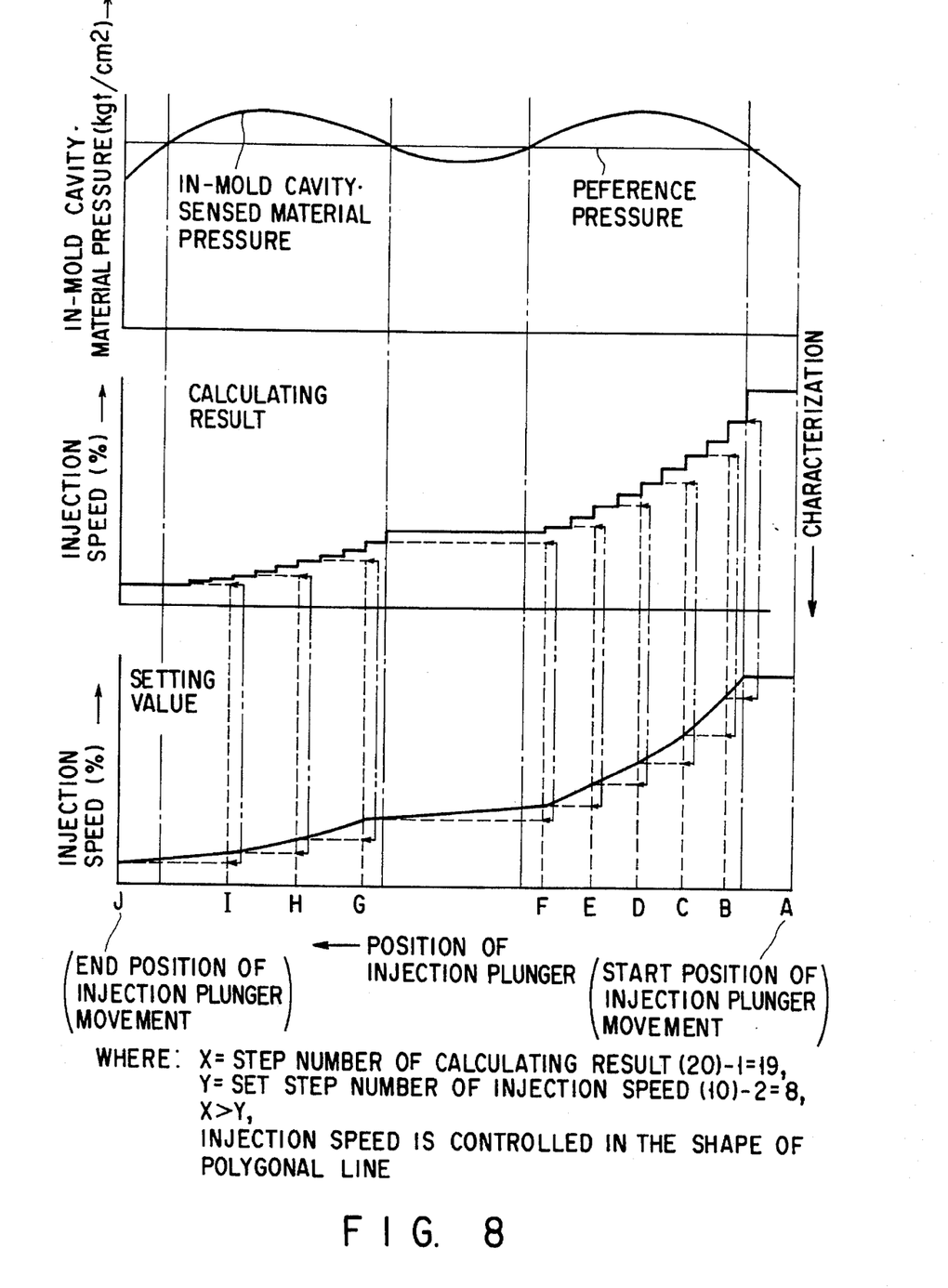
FIG. 8 is a view showing a characterizing example in which corrected values of injection speeds and those of injection plunger positions at a plurality of steps of a calculating result are characterized to values of injection speeds and injection plunger positions of the second and the following steps in a desired set number of steps, wherein the number of the steps of the calculating result is 20, a desired set number of the steps of the injection speed is 10, (that is, X=20−1=19, Y=10−2=8, X>Y), a reduction rate of the injection speed at a first step is 90.0%, and a pattern of each step of the injection speed is shaped in a polygonal line.

FIG. 8 shows a characterizing example in which the number of steps of the calculating results is 20, a desired set number of steps of the injection speed is 10, (that is, X=20−1=19, Y=10−2=8, X>Y), a reduction rate of the injection speed at a first step is 90.0% in this example, and a pattern of each step of the injection speed is shaped in a polygonal line.

Figure 9:
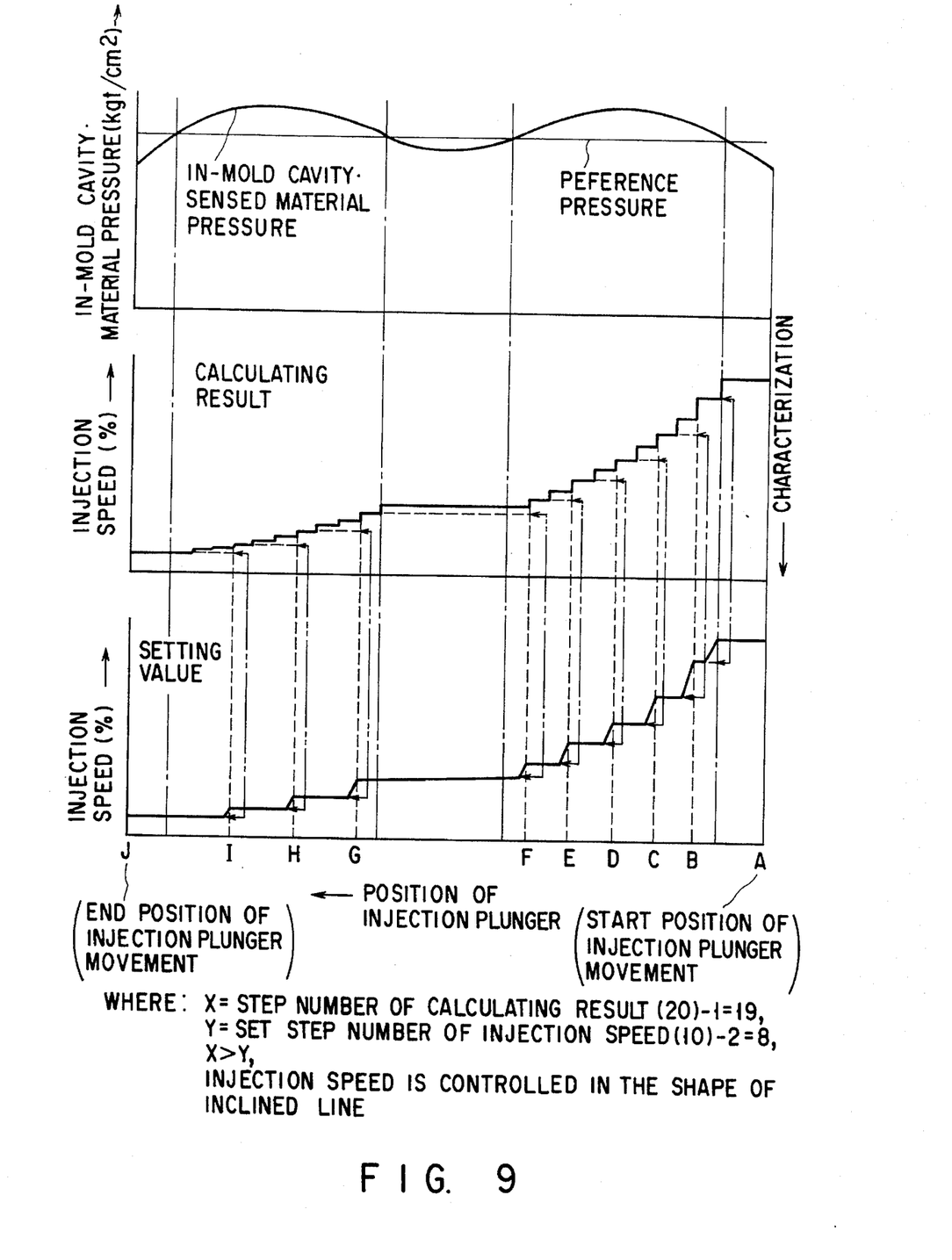
FIG. 9 is a view showing a characterizing example in which corrected values of injection speeds and those of injection plunger positions at a plurality of steps of a calculating result are characterized to values of injection speeds and injection plunger positions of the second and the following steps of a desired set number of steps, wherein the number of the steps of the calculating result is 20, a desired set number of the steps of the injection speed is 10, (that is, X=20−1=19, Y=10−2=8, X>Y), a reduction rate of the injection speed at a first step is 90.0%, and a pattern of each step of the injection speed is shaped in an inclined line.

FIG. 9 shows a characterizing example in which the number of steps of the calculating result is 20, a desired set number of steps of injection speed is 10, (that is, X=20−1=19, Y=10−2=8, X>Y), a reduction rate of the injection speed at a first step is 90.0%, and a pattern of each step of the injection speed is shaped in an inclined line.

As is obvious from the above description, according to the method of the present invention, for automatically setting the injection molding speed of an injection molding machine, the condition of the injection molding speed can be easily set for a short period time with a small number of trial-moldings.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method for automatically setting an injection molding speed condition in an injection molding machine which moves an injection plunger thereby injecting melted material into a mold cavity of a mold, said method comprising:

setting a reference pressure of the melted material injected into the mold cavity as a function of injection passing time from a start of an injecting process or a function of a distance of movement of the plunger, the movement of the plunger being started at a temporarily constant injection speed;

calculating a correction value of the injection speed for eliminating a difference between a sensed pressure of the melted material injected into the mold cavity and the reference pressure in a range of the injection passing time or the distance of movement of the plunger in which the sensed pressure of the melted material exceeds the reference pressure;

correcting the injection speed in accordance with the corrected value; and setting an injection molding speed condition, said injection molding speed condition setting step comprising:

storing the corrected value of the injection speed, and the injection passing time or the distance of the movement of the plunger, corresponding to the range, in memorizing means;

characterizing the corrected value and the injection passing time or the distance to a desired injection speed pattern; and reading out the pattern from the memorizing means as an injection molding speed condition.

2. The method according to claim 1, further comprising sensing the pressure of the melted material injected into the mold cavity by at least one of an in-mold material pressure sensor for sensing the pressure of the melted material injected into the mold cavity, a mold opening distance sensor for sensing an opening distance of the injection mold opened by the pressure of the melted material injected into the mold cavity, a nozzle portion material pressure sensor, provided at a nozzle of the injection molding machine, for sensing the pressure of the melted material in the nozzle, and a plunger moving hydraulic pressure sensor of the injection molding machine.

3. The method according to claim 1, wherein the desired injection speed pattern of the injection molding machine has a set number of steps, and wherein said injection molding speed condition setting step further comprises:

using first temporarily set values of the injection speed, a starting position of the injection plunger movement, and an end position of the injection plunger movement, used for setting the reference value in the reference pressure setting step, as first temporary values in the desired injection speed pattern;

using first calculated corrected values of the injection speed and the injection plunger as those of the injection speed and the injection plunger position at a second step in the set number of steps of the desired injection speed pattern; and characterizing second and following calculated corrected values, third and subsequent steps of the set number of steps, wherein the total number of calculated values—1 is defined as X, the set number of steps—2 is defined as Y, Z=an integer portion of the quotient X/Y, and X % Y is defined as a remainder obtained when X is divided by Y, and further wherein:

(1) in the case of X>Y, the following Y−X % Y steps after the second step of the set number of steps uses the corrected values of the injection speed and the injection plunger positions at every Z step of the calculated corrected values, and the steps of a residual number in the set number of steps uses the corrected values of the injection speed and the injection plunger position at every Z+1 step of the calculated corrected values;

(2) in the case of X=Y, the corrected values of the injection speeds and the injection plunger positions at the second and following steps of the calculated corrected values are directly characterized to the injection speeds and the injection plunger positions at the steps following the second step of the set member of steps of the injection speed; and (3) in the case of X<Y, the corrected values of the injection speeds and the injection plunger positions at the second and following steps of the calculated corrected value are directly characterized to the injection speeds and the injection plunger positions at the steps following the second step of the set number of steps of the injection speed, and the corrected values of the injection speed and the injection plunger position at a final step of the calculated corrected values are used as each of the injection speeds and the injection plunger positions at residual steps of the set number steps of the injection speed pattern.

4. A method for automatically setting an injection molding speed condition in an injection molding machine which moves an injection plunger thereby injecting melted material into a mold cavity of a mold, said method comprising:

setting a reference pressure of the melted material injected into the mold cavity to be constant with respect to an injection passing time from a start of an injecting process or a distance of movement of the plunger, the movement of the plunger being started at a temporarily constant injection speed;

calculating a correction value of the injection speed for eliminating a difference between a sensed pressure of the melted material injected into the mold cavity and the reference pressure in a range of the injection passing time or the distance of movement of the plunger in which the sensed pressure of the melted material exceeds the reference pressure;

correcting the injection speed in accordance with the corrected value; and setting an injection molding speed condition, said injection molding speed condition setting step comprising:
storing the corrected value of the injection speed, and the injection passing time or the distance of the movement of the plunger, corresponding to the range, in memorizing means;
characterizing the corrected value and the injection passing time or the distance to a desired injection speed pattern; and
reading out the pattern from the memorizing means as an injection molding speed condition.

5. The method according to claim 4, further comprising sensing the pressure of the melted material injected into the mold cavity by at least one of an in-mold material pressure sensor for sensing the pressure of the melted material injected into the mold cavity, a mold opening distance sensor for sensing an opening distance of the injection mold opened by the pressure of the melted material injected into the mold cavity, a nozzle portion material pressure sensor, provided at a nozzle of the injection molding machine, for sensing the pressure of the melted material in the nozzle, and a plunger moving hydraulic pressure sensor of the injection molding machine.

6. The method according to claim 4, wherein the desired injection speed pattern of the injection molding machine has a set number of steps, and wherein said injection molding speed condition setting step further comprises:

using first temporarily set values of the injection speed, a starting position of the injection plunger movement, and an end position of the injection plunger movement, used for setting the reference value in the reference pressure setting step, as first temporary values in the desired injection speed pattern;

using first calculated corrected values of the injection speed and the injection plunger as those of the injection speed and the injection plunger position at a second step in the set number of steps of the desired injection speed pattern; and characterizing second and following calculated corrected values, within third and subsequent steps of the set number of steps, wherein the total number of calculated values—1 is defined as X, the set number of steps—2 is defined as Y, Z=an integer portion of the quotient X/Y, and X % Y is defined as a remainder obtained when X is divided by Y, and further wherein:

(1) in the case of X>Y, the following Y−X % Y steps after the second step of the set number of steps uses the corrected values of the injection speed and the injection plunger positions at every Z step of the calculated corrected values, and the steps of a residual number in the set number of steps uses the corrected values of the injection speed and the injection plunger position at every Z+1 step of the calculated corrected values;

(2) in the case of X=Y, the corrected values of the injection speeds and the injection plunger positions at the second and following steps of the calculated corrected values are directly characterized to the injection speeds and the injection plunger positions at the steps following the second step of the set member of steps of the injection speed; and (3) in the case of X<Y, the corrected values of the injection speeds and the injection plunger positions at the second and following steps of the calculated corrected value are directly characterized to the injection speeds and the injection plunger positions at the steps following the second step of the set number of steps of the injection speed, and the corrected values of the injection speed and the injection plunger position at a final step of the calculated corrected values are used as each of the injection speeds and the injection plunger positions at residual steps of the set number steps of the injection speed pattern.

* * * * *